March 1, 1960 G. V. YOUNG 2,927,274
HIGH FREQUENCY CHOPPER SYSTEM
Filed Dec. 12, 1957 2 Sheets-Sheet 1

INVENTOR.
GEORGE V. YOUNG
BY Harry R. Lubcke
AGENT

March 1, 1960 G. V. YOUNG 2,927,274

HIGH FREQUENCY CHOPPER SYSTEM

Filed Dec. 12, 1957 2 Sheets-Sheet 2

INVENTOR.
GEORGE V. YOUNG

BY Harry R. Lubcke
AGENT 2,927,274
Patented Mar. 1, 1960

2,927,274

HIGH FREQUENCY CHOPPER SYSTEM

George V. Young, Los Angeles, Calif.

Application December 12, 1957, Serial No. 702,311
9 Claims. (Cl. 330—10)

My invention relates to means for producing an alternating current proportional in amplitude to that of a direct current, and more specifically to a system of electrical amplification in which the alternating current is produced by a magnetrostriction driven capacitor, the alternating current amplified and then reconverted to direct current.

Superior electrical stability is achieved in accomplishing a high degree of direct current amplification by forming an alternating current of amplitude proportional to the feeble direct current to be amplified, amplifying the alternating current by relatively stable alternating current amplifiers and then rectifying the amplified result at the output level desired to obtain the direct current attributes of the original energy.

Nevertheless, the art has been handicapped heretofore by drift in the means to convert the feeble direct current to alternating current and in the relatively low frequency of alternating current it has been feasible to form. Mechanically vibrating reeds, reciprocating motor or conventional motor mechanical drives for variable capacitors have been employed. Such devices are incapable of operating at frequencies much in excess of sixty cycles per second and are inherently disturbing because of hum. The relatively long time constants required in an alternating current amplifier for this frequency results in a relatively large amplifier structure and one susceptible to motor-boat (relaxation) instability and residual interference from electric power sources.

My system is capable of operating at frequencies up to the order of sixty thousand cycles per second. This extension of the frequency range makes possible small, stable and interference-free high gain amplifiers. It also makes possible a system capable of following rapid changes in the initial direct current energy with very many times the fidelity of the devices of the prior art. Only the feeble direct current energy itself is applied to the variable capacitor employed to convert this energy to alternating current. The input impedance of my system is substantially infinite, having been measured as in excess of 10,000 megohms.

While transistor electrical choppers have been proposed I have found that the well-known dependence of transistor characteristics upon ambient and working temperatures causes such converters to have serious drifts in conversion level. A desirable operating stability is not attained.

I accomplish stabilized high frequency chopping by forming a temperature-independent magnetrostriction-driven variable capacitor having plural capacitive circuits. One such circuit is utilized to accomplish the direct current to alternating current conversion. Another is made a part of a closed feed-back loop to insure that the amplitude of the capacitance variaiton shall remain constant regardless of ambient conditions. In this manner I am able to provide a system of small size, high electrical stability, and insensitivity to interference and ambient conditions.

An object of my invention is to provide a system for amplifying feeble direct currents by conversion to and amplification at alternating current frequencies in the kilocycle to decakilocycle range.

Another object is to provide a variable capacitance chopper for such a system having a feedback loop for maintaining the conversion of direct to alternating current electrical energy constant regardless of ambient conditions.

Another object is to provide a capacitance converter element devoid of mechanically rotating, laterally vibrating or linked parts.

Another obpject is to provide a conversion type amplifying system capable of following very rapid variations of the initial electrical energy with fidelity.

Another object is to provide a system for amplifying direct current that is stable, of small size, of light weight and one which requires a relatively small operating voltage and amount of operating power.

Other objects of my invention will become appparent upon reading the following detailed specification and upon examining the accompanying drawings, in which.

Figure 1:
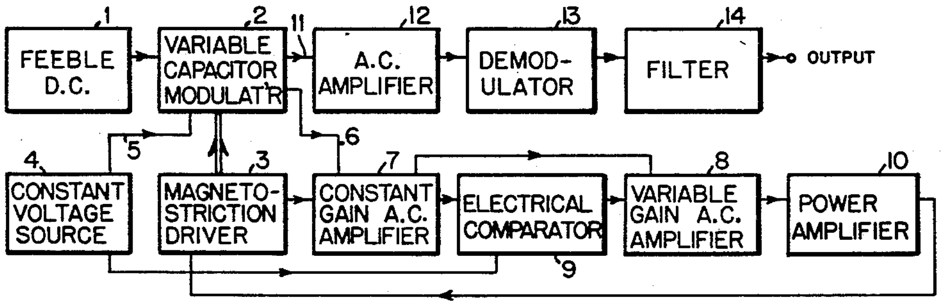
Fig. 1 shows a block diagram of the circuit functioning of my system.

In the block diagram of Fig. 1 numeral 1 represents the source of low level or feeble direct current electrical energy which is to be amplified. This may arise from a strain gage, accelerometer, ionization chamber, or similar usually transducive device.

This initial energy is impressed upon the variable capacitor modulator 2. Here an alternating current is produced because of the cyclic variation of the capacitance of the capacitor, the voltage corresponding thereto being proportional to the voltage of the initial direct current energy which charges the capacitor. Magnetrostriction driver 3 is comprised of a magnetostrictive structure to which is attached a movable capacitor plate. This is close capacitative relation to plural stationary capacitor plates of block 2. Being charged by constant voltage source 4 over conductor 5 an auxiliary stationary capacitor plate produces an electrical output over conductor 6 from modulator 2. This enters the input of constant gain amplifier 7, one output of which is conveyed to variable gain amplifier 8 in order to preserve the feedback loop of this oscillator-like circuit. Another output from amplifier 7 passes to electrical comparator 9, which latter is also connected to constant voltage source 4. When the contribution from amplifier 7 exceeds that of voltage source 4 by a specified amount, comparator 9 supplies an increased bias output to reduce the gain of variable gain amplifier 8, and vice versa. This metered output is impressed upon the input of power amplifier 10, the output of which drives the magnetostriction driver 3; thus completing a round robin electro-vibratory circuit which oscillates at the natural frequency of the magnetostrictive structure 3.

Because of a concomitant stationary plate structure that portion of variable capacitor modulator 2 which serves the main amplifying portion of my system varies also uniformly in capacitance regardless of ambient conditions. The resulting alternating current passes over conductor 11 to main high-gain alternating current amplifier 12, which also has constant gain. The output of this amplifier, is, of course, an alternating current proportional to the initial direct current in amplitude. While this output may be used in certain applications, demodulator 13 rectifies the same and thereby provides approximately an amplified direct current proportional to the initial feeble direct current. Filter 14 smooths the relatively high frequency ripple from this output to provide a true direct current. Since the sime constant necessary to accomplish this is relatively very short compared to that required for equivalent smoothing with low frequency chopper devices of the prior art, the capability of my system in following rapid changes in the initial direct current is very good.

Figure 2:
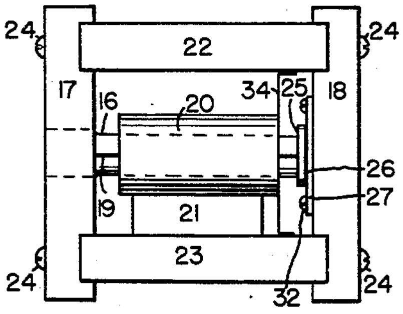
Fig. 2 shows an assembled side elevation view of my magnetrostrictive delta capacitor.

In the magnetostriction delta capacitor structure of Fig. 2 element 16 is the magnetostrictive tube. It is fastened, as by soldering, into end piece 17 and extends substantially to the opposite end piece 18. The thickness of this tube is not critical but I prefer a thickness not in excess of 1/64 inch for efficient magnetostrictive action; i.e., the variation in length thereof with variation of magnetic field. In order to further increase this efficiency a narrow longitudinal slit 19 extends the free length of the tube. This inhibits eddy currents.

The magnetic field required is provided by multilayer cylindrical coil 20, having of the order of 200 turns. The inner diameter of the coil is larger than the outer diameter of tube 16 so that the latter is free to vibrate. The coil is mounted on support 21, such as a block of phenolic insulating material, and may be fastened with an epoxy cement.

The basic structure is completed by longitudinal elements 22 and 23. These are preferably of nickel, the same as the magnetostrictive tube. This is not to accomplish a magnetostrictrice effect but to provide a self-compensating structure with respect to temperature. The longitudinal elements and the magnetostrictive tube are of approximately the same length so the same linear expansion occurs in each with a given temperature increase. The thickness of the air dielectric of the variable capacitor thus remains constant regardless of temperature changes. As shown, the longitudinal elements are slightly longer than the magnetostrictive tube. This tend to compensate for the slight amount of heat generated in the coil by IR loss and in the tube because of residual eddy currents. In operation, the tube tends to be warmer but the longitudinal elements are longer. With a common coefficient of linear expansion the gross expansion of each tube tends to be the same.

The end pieces 17 and 18 should be of good heat conducting material, such as a metal, but need not be of magnetostrictive material. The structure is fastened together by a plurality of screws 24.

The movable plate 25 of the variable capacitor is attached to the free end of magnetostrictive tube 16. This plate has the form of a stepped disk, one part of which is soldered or otherwise firmly attached to the free end of the tube. The stepped-down portion extends slightly into the tube. The active surface of the movable plate is of the same conductive material as that of the stationary plate surface. In order to minimize contact potential effects these surfaces are preferably electroplated with gold or one of the platinum metals. The active diameter of the movable and stationary plates may be of the order of a half inch and the spacing 0.0015 inch (one and one-half thousandths).

Figure 3:
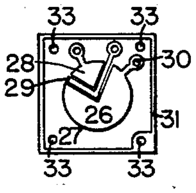
Fig. 3 shows the detail of the stationary plates of said capacitor.

The stationary plate structure is shown in greater detail in Fig. 3. It is conveniently formed of etched metal upon an insulating substrate after the process of printed circuitry. Piece 27 is the insulating substrate, preferably of a structurally stable glass-filled insulator. Upon this the main stationary plate 26 is formed by the process identified, along with the auxiliary stationary plate 28 and a shield 29 between the two. Plate 26 has a connection tab leading to hole 30 through which external electrical connection is made thereto, and auxiliary plate 28 and shield 29 have equivalent connection means as shown. Surrounding the stationary structure proper is a narrow metallic border 31, which acts as a shield from extraneous fields. This shield is electrically connected to the general structure of Fig. 2 by one of four screws 32 which pass through holes 33. An additional shield 34, of a good conductor such as copper, is situated between coil 20 and the plate assembly, being located relatively close to the coil and extending to the edges of the overall structure. A circular hole is provided in the center for magnetostrictive tube 16 to pass through. This is of sufficiently large diameter to avoid contact with the tube, yet no larger than necessary to avoid loss of shielding effect. This shield prevents the alternating electrostatic field of the coil from inducing charges upon the plates of the variable capacitor.

The main capacitance of the main stationary plate 26 to movable plate 25 is of the order of 30 micromicrofarads and that of auxiliary plate 28 is 5 micromicrofarads. The variation of capacitance with magnetostriction is a considerable fraction of these capacitances.

The length of the magnetostrictive tube 16 determines the mechanically resonant frequency thereof and sets the frequency of operation for the system. My tube is a quarter wavelength in length. I found that this length reduced the driving power required to half that for the usual half wavelength arrangement, reduced the size of the structure by one half and resulted in a higher Q, of the order of one thousand. For a free length of the order of 1¾" for a pure nickel tube the resonant frequency is 20,000 cycles. This frequency has been used for typical embodiments.

Figure 4:
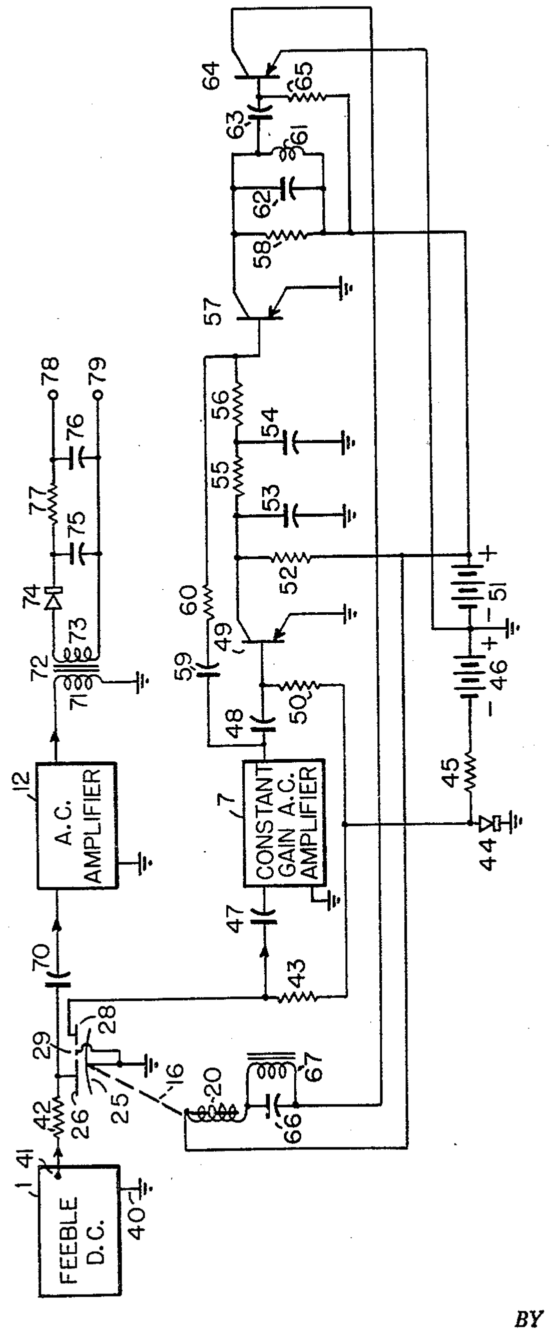
Fig. 4 is the schematic circuit diagram of my system.

In the schematic circuit diagram for my system, Fig. 4, the source of feeble D.C. electrical energy is the same as indicated in Fig. 1. One terminal 40 thereof is shown grounded, which is usual, but this need not be connected to actual ground potential. All the ground connections shown are merely connected to a common conductor. The initial direct current signal, typically one having various datums of electrical levels with rapid or slow transitions therebetween, appears at terminal 41 and passes to resistor 42, the latter having a resistance of a number of megohms. This resistor acts as a load impedance across which the alternating voltage is developed; being particularly necessary for a low impedance source 1, such as a strain gage.

The opposite terminal of resistor 42 connects to stationary plate 26. Movable plate 25 moves toward and away from plate 26 because of the alteration of length of rod 16 by magnetostriction. The same variation occurs between movable plate 25 and auxiliary stationary plate 28. Shield 29 is grounded in order to minimize the charges impressed upon one stationary plate from affecting the charges impressed upon the other.

The feedback loop used to drive and control the amplitude of vibration of movable capacitor plate 25 will first be described. This starts with auxiliary stationary plate 28. Connected thereto is resistor 43 of the order of ten megohms resistance. The opposite terminal of this resistor is connected to Zener diode 44. This acts as the principal element of the constant voltage source 4 of Fig. 1. The other terminal of the diode is connected to ground. The first-mentioned diode connection is also connected to resistor 45, having a resistant of the order of 6,000 ohms and connecting to the negative terminal of battery 46. This battery may have a considerable range of voltages for different embodiments but a voltage of 28 volts is usual in aeronautical and missile applications. As shown, a constant voltage of five volts appears across the Zener diode. This acts as a polarizing voltage between stationary auxiliary plate 28 and movable plate 25. A level of alternating currentt is thus produced because of the motion of the movable plate at the magnetostriction vibration frequency. This is impressed upon constant gain A.C. amplifier 7 through coupling capacitor 47, which may have a capacitance of 200 micro-microfarads. In a typical embodiment an alternating sine wave voltage of the order of a half volt peak to peak and of a frequency of 20,000 cycles per second appears across resistor 43.

Constant gain A.C. amplifier 7 is conventional and therefore is not further detailed. My system is preferably completely transistorized, thus a two stage transistor amplifier with negative feedback for gain stabilization, a gain of 20 times (26 db), and an operating frequency of 20,000 cycles is preferred.

The output of amplifier 7 passes through coupling capacitor 48 of 0.002 microfarad capacitance and to the base connection of transistor 49. The base is back-biased at minus five volts from Zener diode 44 through resistor 50, of 20,000 ohms resistance. The emitter of transistor 49 is grounded and the collector is connected to a voltage of the order of 28 volts positive polarity from battery 51 through resistor 52, also of 20,000 ohms resistance.

Transistor 49 and associated elements compose electrical comparator 9. Because of the back-bias on the base thereof a voltage in excess of five volts must be delivered by amplifier 7 to cause current to flow in the collector circuit. The normal output from auxiliary plate 28 after amplification by amplifier 7 results in an output therefrom of the order of 12 volts peak to peak. The positive half of this, or 6 volts peak, is effective in overcoming the negative five volts bias. With the amplitudes stated the system is in equilibrium at the mid-range of the characteristic of transistor 49 and so an average value of current flows at the collector. However, if a variation of any circuit parameter or ambient condition causes the output mentioned to increase the collector current increases to correct the condition, and vice versa for a decrease. Transistor 49 is one having a high beta function, of the order of one hundred, and so the collector current response for a small signal change to the base is large.

The collector current is in the form of the top portions of each positive half sine wave from amplifier 7. For gain control purposes it is desirable that this energy be reduced to a corresponding level of direct current. Accordingly, capacitors 53 and 54, of 0.01 and 0.1 microfarads capacitance respectively, and resistors 55 and 56, of 20,000 and 150,000 ohms respectively, constitute a low pass filter of shunt capacitors and series resistors. This filter is connected to the collector of transistor 49 and is effective in reducing the 20,000 cycle energy to an equivalent direct current.

The above-described bias is impressed upon the base electrode of another transistor 57. This may be of the variable gain type, such as the NPN silicon type 2N118. As before, the emitter is connected directly to ground and the collector to the positive terminal of 28 volt battery 51 through resistor 58 of 5,000 ohms resistance.

It will also be noted that there is a connection from the output of amplifier 7 to the base (input) of transistor 57. Capacitor 59 of 0.001 microfarads capacitance and resistor 60 of the order of 150,000 ohms resistance are located in this connection for isolation between amplifier 7 and transistor 49.

In operation, the output of transistor 57 is metered by the bias from transistor 49 such that an excessive amplitude of 20,000 cycle energy from amplifier 7 is decreased to a normal value, and vice versa. This effect is equivalent to the known behaviour of a variable mu vacuum tube stage.

In the collector circuit of transistor 57 inductor 61 and capacitor 62 are connected in a parallel resonant circuit across resistor 58. This is a phase adjusting circuit required to shift the phase of the 20,000 cycle energy flowing in the whole feedback loop to reinforce the magnetostriction oscillations and thus the oscillation of the whole loop. An inductance of the order of 10 millihenries and a capacitance of 0.004 microfarad are suitable values to accomplish the required degree of shift. By altering these values to obtain slightly different resonant frequencies other phase shifts may be obtained as may be required in any particular embodiment.

Through coupling capacitor 63 of 0.1 microfarad capacitance the output of transistor 57 is conveyed to the base of power transistor 64. The base return is through resistor 65 to the positive terminal of battery 51. Transistor 64 may be of the 2N389 type capable of 35 watts dissipation. A heat dissipation sink provided with radiating fins is desirable in maintaining the temperature of this transistor within operating limits. The emitter of transistor 64 is connected directly to the negative terminal of battery 51. The collector is connected to one end of coil 20, which surrounds the magnetostrictive tube. The other end of this coil is connected through capacitor 66 and inductor 67 to the postive terminal of battery 51.

Capacitor 66 is utilized to at least partially tune the electrical circuit composed of coil 20 and capacitor 66 to series resonance at the operating frequency of 20,000 cycles. This reduces the reactive volt amperes required to drive the magnetostrictive tube and so increases the efficiency of the device. Inductor 67 is merely to provide a direct current path for the operating current of the transistor. It also provides a direct current bias on the magnetostrictive structure so that this vibrates at fundamental frequency, not twice fundamental frequency as would be true if a direct current bias was absent. Transistor 64 operates class A as an amplifier and so the constant collector flow supplies the direct current. Inductor 67 may be a fraction of a henry inductance and capacitor 66 0.2 microfarad.

The above-described feedback loop will be recognized as a highly desirable manner of obtaining a self-compensating drive for a capacitative chopper. The nature of the compensation has been found to be satisfyingly complete. For instance, mechanical deformation of the magnetostriction structure of Fig. 2 by the application of an external force to alter the spacing between the stationary and movable plates thereof is not followed by an alteration of conversion factor from D.C. to A.C., but by a change in the input to comparator transistor 49, thus indicating a change takes place in the comparator to equalize the output from the power transistor to normal. In this manner of functioning nearly all ambient conditions which may affect the system are compensated for.

Returning now to the main stationary capacitor plate 26 and knowing that the variation of capacitance between this plate and movable plate 25 is accurately metered to remain at constant magnitude it is seen that the polarizing voltage upon plate 26 due to the feeble D.C. potential to be amplified determines what the amplitude of the resulting alternating voltage shall be. Through coupling capacitor 70, of about 200 micromicrofarads capacitance, the alternating signal at 20,000 cycles frequency passes to A.C. amplifier 12. This amplifier is preferably transistorized and one having a stable gain of the order of 10,000 times (80 db). A plural cascaded stage transistor amplifier with negative feedback suffices for this purpose and since such is known it is not detailed here.

Alternating current amplified by amplifier 12 passes through primary 71 of output transformer 72. This is a small untuned one-to-one ratio transformer effective in carrying the 20,000 cycle frequency and is employed principally to allow the output terminals of the system to be independent of ground or any other fixed potential. The secondary 73 thereof connects to diode 74, such as a 1N89, which demodulates the 20,000 cycle "carrier" to obtain half cycles of one polarity and of amplitude proportional to the original amplitude of the feeble D.C.

Capacitors 75 and 76, having a capacitance of 0.1 microfarad each, and resistor 77, having a resistance of the order of 10,000 ohms, comprise the filter for the main circuit. This removes the 20,000 cycle ripple from the output of the demodulator and thereby makes available an amplified magnitude of the original feeble D.C. energy. Terminals 78 and 79 provide the output. In a typical embodiment this is 5 volts for a change in input of 10 millivolts. With greater gain in amplifier 12 smaller inputs may be amplified. The system is capable of following rapid rectangular wave variations, such as may occur in 0.0005 second.

Certain alternate embodiments of my invention are possible.

Capacitor 66 and inductor 67 may be eliminated, if desired, since it is feasible to drive the magnetostrictive tube 16 from easily available power transistors without the aid of series resonance. Such an elimination reduces the size and weight of the system to some degree. In any event the system occupies only a small fraction of a cubic foot in volume and weighs only a few pounds, most of the weight being resident in the rigid magnetostriction structure. The latter weight may be reduced by drilling weight-reduction holes in elements 17, 18, 22 and 23, with the usual regard for retaining adequate structural rigidity.

While an operating frequency of 20,000 cycles (20 kc.) has been employed in the embodiments described, the operating frequency may be varied over the range over which magnetostriction is feasible, say from 10 kc. to over 100 kc. As the frequency of operation increase the size of the magnetostriction structure decreases and the capability of following rapid changes in signal level increases. At frequencies of 20,000 cycles and above the operation of the system is inaudible, but at frequencies below 15 kc. a tone is heard conforming to known audio practice.

The gains of the several amplifiers shown in Fig. 1 may be altered to accommodate special conditions. The control level in the auxiliary feedback circuit may be higher or lower than that described. The amplification of the main A.C. amplifier may be greater or less than that described for amplifier 12 depending upon the use to which the amplified signal is to be put. Likewise, the demodulator 13 and filter 14 may be omitted should a modulated alternating carrier in the kilocycle range be desired. One example of such a case is for modulating telemeter transmitters, and similar devices.

Batteries 46 and 51 may be replaced with power supplies, which should be regulated.

It is possible to omit the shielding border 31 where stray electrostatic fields are small. This shield may also be connected to a ground other than end piece 18 by eliminating the conducting portion around the lower right hole 33 and by providing a tab elsewhere for external connection.

Specific circuit values and dimensions have been given for a preferred embodiment in the interest of clarity. These are subject to rather wide variations without departing from the scope of my invention.

I claim:

1. An electrical system to amplify weak direct currents comprising plural variable capacitors having a magnetostriction driver, a variable gain electrical feedback loop connected to one of said capacitors and to said magnetostriction driver to vary the capacitance of said capacitors at constant magnitude, and amplifier means connected to another of said capacitors to provide an amplified amplitude of electrical energy impressed upon said other capacitor.

2. An electrical system for strengthening feeble direct current signals comprising two variable capacitors simultaneously varied by a magnetostrictive element, a variable gain electrical loop connected to one of said capacitors through an amplifier source of electrical energy and to said magnetostrictive element for obtaining rapidly alternating variations of the capacitance of said capacitors of constant magnitude; another amplifier connected to the other said capacitor and to a demodulator for obtaining an amplified electrical representation of electrical energy impressed upon said other capacitor.

3. An electrical system for amplifying low D.C. signals comprising first and second variable capacitors, magnetostriction means to simultaneously vary the capacitance of said variable capacitors, comparator means, a variable gain amplifier, said second variable capacitor connected to said comparator means and to said variable gain amplifier, said comparator means connected to said variable gain amplifier to vary the gain thereof as required to maintain a constant amplitude of alternating electrical energy therefrom, said variable gain amplifier connected to said magnetostriction means for the excitation thereof; and means to amplify alternating electrical energy connected to said first variable capacitor to provide an amplified representation of electrical energy impressed upon said first variable capacitor.

4. An electrical amplifying system for feeble direct current comprising a first and a second variable capacitor, quarter wave magnetostriction means to simultaneously vary the capacitance of said variable capacitors, a constant electrical source, electrical comparator means, a variable gain amplifier, said second variable capacitor connected to said constant electrical source, to said electrical comparator means, and to said variable gain amplifier, said constant electrical source connected to said electrical comparator means and said electrical comparator means connected to said variable gain amplifier to vary the gain thereof as required to maintain a constant amplitude of alternating electrical energy therefrom, said variable gain amplifier connected to said magnetostriction means for the excitation thereof; means to amplify alternating electrical energy connected to said first variable capacitor, and demodulation means connected to said means to amplify to provide an amplified representation of electrical energy impressed upon said first variable capacitor.

5. A system for amplifying weak direct current electrical energy having a magnetostrictive element, a movable capacitor element connected to said magnetostrictive element, a first stationary capacitor element adjacent to said movable capacitor element, a second stationary capacitor element also adjacent to said movable capacitor element, a shield between said first and said second stationary capacitor elements, electrical means to drive said magnetostrictive element, further means connected to said second stationary capacitor element and to said means to drive to maintain a constant amplitude of vibration of said movable capacitor element, and other means connected to said first stationary capacitor element to amplify said electrical energy.

6. A system for amplifying feeble direct current electrical energy having a quarter wavelength magnetostrictive tube, a movable capacitor plate attached to a free end of said tube, a first stationary capacitor plate closely adjacent to said movable capacitor plate, a second stationary capacitor plate coplanar with and smaller than said first stationary capacitor plate, an electrostatic shield interposed between said first and said second stationary capacitor plates, a driving coil surrounding said magnetostrictive tube, means connected to said second stationary capacitor plate and to said driving coil to sustain magnetostrictive vibration of said tube at constant amplitude, and other means connected to said first stationary capacitor plate to provide an amplified electrical output corresponding to said feeble direct current electrical energy.

7. An electrical system for amplifying weak direct current electrical energy having a magnetostrictive variable capacitor, a capacitor electrode to develop an alternating electrical potential, a constant potential source, a transistor, said source connected to said transistor to back-bias the same, said capacitor electrode also connected to said transistor through an amplifier to oppose said back-bias by said alternating electrical potential and to produce rectified electrical energy at the output of said transistor, an electrical filter connected to said transistor to smooth said rectified electrical energy to an average potential, a variable gain transistor connected to said capacitor electrode and to said filter to provide an alternating electrical potential output of constant amplitude, said variable gain transistor connected to said magnetostrictive capacitor through driving means to actuate the same at constant capacitance variation.

8. A system for amplifying low level direct current signals comprising a movable capacitor element, a magnetostriction member, said movable capacitor element attached to said member, means to vibrate said magnetostriction member, a stationary capacitor element and an auxiliary element adjacent to said movable capacitor element, amplifier means connected to said auxiliary element, a voltage source, comparator means connected to said amplifier means and to said voltage source to pass electricity proportionally as the output of said amplifier means exceeds the voltage of said voltage source, variable gain means connected to said amplifier, said comparator means connected to said variable gain means to alter the gain of said variable gain means according to the electricity passed by said comparator means, said variable gain means connected to said means to vibrate said magnetostriction member for the vibration thereof; other amplifier means connected to said stationary capacitor element to amplify alternating current formed thereat by vibration of said movable capacitor element, and means to form the amplitude envelope of said alternating current, the same constituting an amplified representation of potentials impressed between said movable and said fixed capacitor elements.

9. A system for amplifying feeble direct currents comprising a movable capacitor plate, a quarter wavelength cylindrical magnetostrictive tube, said movable capacitor plate attached to an extremity of said tube, a coil of wire surrounding said tube, a mounting frame attached to the other extremity of said tube and of the same material as said tube, a stationary capacitor plate affixed to said frame closely adjacent to said movable capacitor plate, an auxiliary capacitor plate similarly affixed, an electrostatic shield interposed between said stationary and said auxiliary capacitor plates, a constant gain amplifier connected to said auxiliary capacitor plate, a Zener diode voltage reference, a comparator amplifier stage connected to said constant gain amplifier and to said voltage reference to pass more current as the output of said constant gain amplifier exceeds the voltage of said voltage reference, a variable gain amplifier stage connected to said constant gain amplifier, said comparator amplifier stage connected to said variable gain amplifier stage to alter the gain of said variable gain amplifier according to the amplitude of the current passed by said comparator amplifier stage, a power amplifier stage connected to said variable gain amplifier stage, the output of said power amplifier stage connected through a capacitor and inductor in parallel to said coil, said capacitor and said coil forming a low Q series resonant circuit, phase adjusting means connected to said variable gain amplifier stage to support oscillation of the described circuit at the frequency of vibration of said magnetostrictive tube and at a fixed amplitude of vibration; an other amplifier connected to said stationary capacitor plate to amplify the alternating current formed by the motion of said movable capacitor plate with respect to said stationary capacitor plate because of the vibration of said magnetostrictive tube, an isolating transformer connected to said other amplifier, a rectifying diode connected to said isolating transformer, and a filter connected to said rectifying diode to filter out the frequency of alternating current determined by the frequency of vibration of said magnetostrictive tube; the system adapted to supply an amplified direct current at the output of said filter corresponding to said feeble direct currents.

References Cited in the file of this patent

UNITED STATES PATENTS 2,372,062 Dorsman ---------------- Mar. 20, 1945